Figure 1:
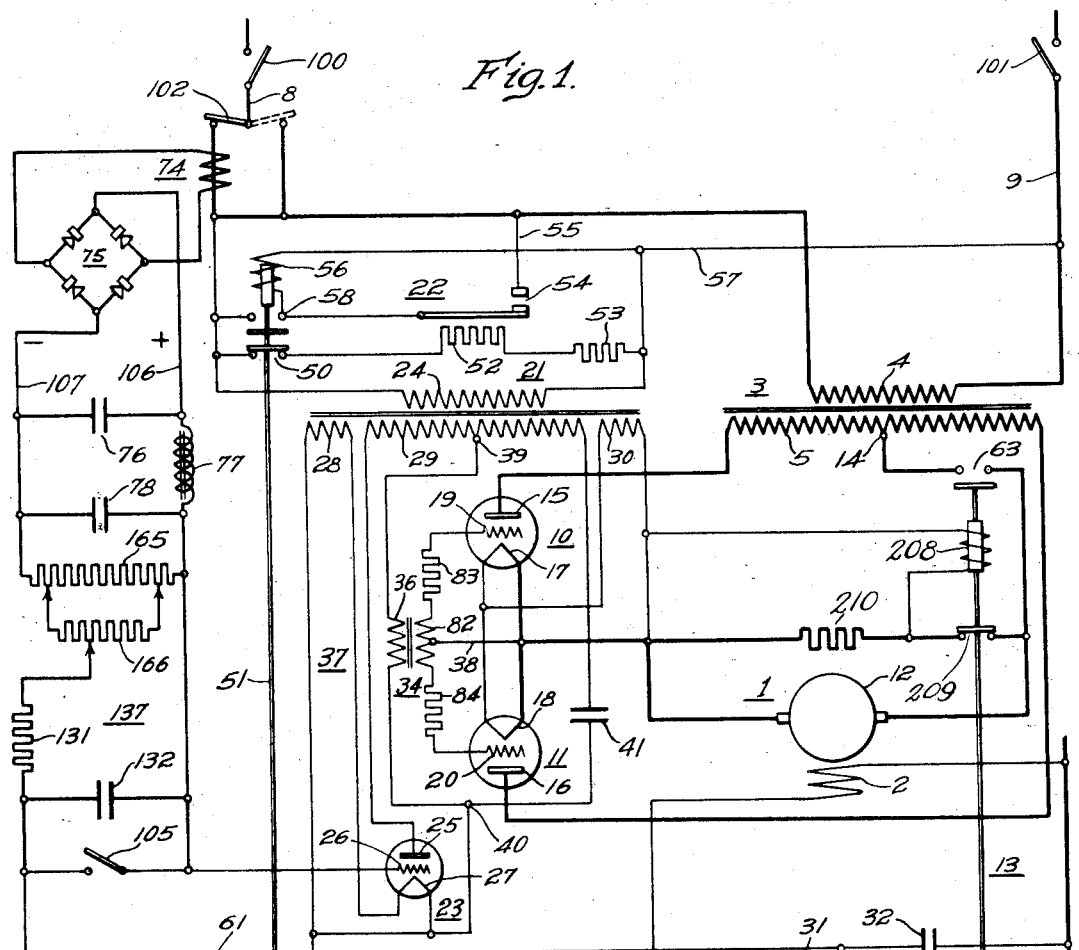

June 12, 1934.   R. A. GEISELMAN   1,962,344
MOTOR CONTROL SYSTEM
Filed Feb. 23, 1933

WITNESSES:
C. J. Willer.
Paul E. Friedemann

INVENTOR
Ralph A. Geiselman.
BY
W. R. Coley
ATTORNEY

Patented June 12, 1934

1,962,344

UNITED STATES PATENT OFFICE 1,962,344

MOTOR CONTROL SYSTEM

Ralph A. Geiselman, Wilkinsburg, Pa., assignor to Westinghouse Electric & Manufacturing Company, East Pittsburgh, Pa., a corporation of Pennsylvania Application February 23, 1933, Serial No. 658,015

8 Claims. (Cl. 172—288)

My invention relates generally to motor control systems and more particularly to control systems that may be utilized for controlling the operation of electric motors.

One object of my invention is to control the operation of a direct current motor when connected to a source of alternating current by the use of electronic discharge devices also interconnected with the source of alternating current.

Another object of my invention is to provide for controlling the operation of electric motors without the use of accelerating contactors.

A further object of my invention is to provide for controlling the variations in speed of an electric motor as a function of the load on the motor by the use of specially controlled thermionic devices.

A still further object of my invention is to provide for automatically and in a continuous manner accelerating an electric motor from rest to any preselected speed at a rate having a definite relation to the load on the motor.

It is also an object of my invention to accelerate a motor by the use of thermionic devices as a function of the load on the motor and without the use of accelerating contactors.

One other object of my invention is the provision of a control system of the class indicated that shall be simple and reliable in operation and be readily and economically manufactured and installed.

Figure 2:
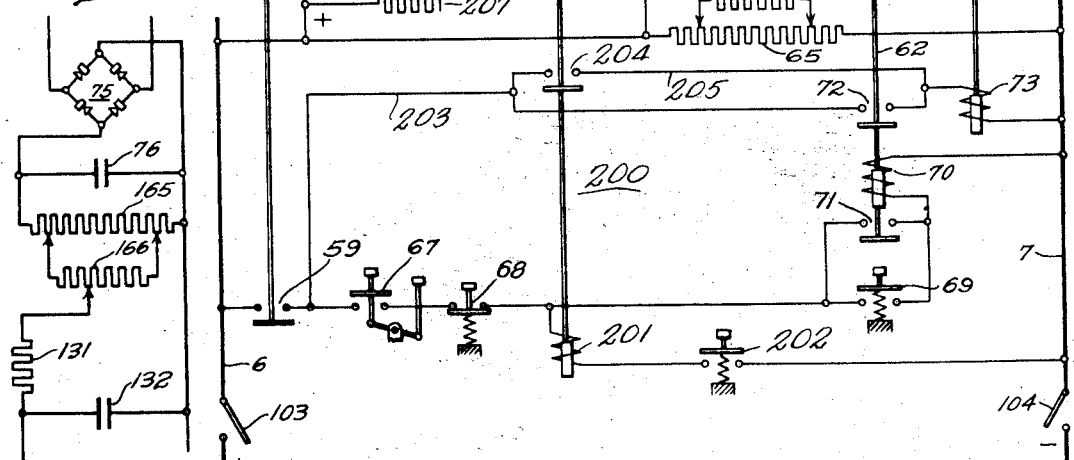

Additional objects of my invention and the novel and useful features thereof will become more apparent from a study of the following specification particularly when such study is made in conjunction with the drawing accompanying the specification and, in which;

Figure 1 is a diagrammatic showing of a control system for an electric motor which embodies the features of my invention; and Fig. 2 is a diagrammatic showing of a modification embodying features of my invention.

With particular reference to Fig. 1, my invention includes a motor 1 having a field winding 2, a transformer having a primary winding 4 and a secondary winding 5. The field winding 2 may be energized from a suitable source of direct current designated by buses 6 and 7 or, when only alternating current is available, may be energized from alternating current buses 8 and 9, through suitable asymmetric units or rectifiers connected intermediate buses 8 and 9 and 6 and 7. A pair of thermionic devices or power tubes 10 and 11 and contactor 13 are provided for connecting armature 12 of the motor 1 in circuit relation with the secondary winding 5.

To energize the units and circuits just referred to, suitable switches 100, 101, and 102, and 103 and 104 are provided intermediate the respective sources of energy and buses 8 and 9 and 6 and 7, respectively. A bridge phase-shifting circuit 37 is provided for shifting the phase angle of the grid potentials of the gas-filled grid-controlled power tubes or thermionic devices 10 and 11 relative to their respective anode potentials.

The power tubes 10 and 11 are essentially gas-filled grid-controlled gaseous discharge tubes and comprise, respectively, the principle electrodes consisting of anodes 15 and 16 and cathodes or filaments 17 and 18, and the control electrodes or grids 19 and 20. Inasmuch as power tubes of the type discussed have the property of rectifying alternating current, I provide two tubes in order to give doublewave rectification. However, it will be readily understood that my invention is operable by using only one grid-controlled power tube.

The power tubes 10 and 11 are preferably of the well known type wherein the cathode comprises a filament surrounded by an inert gas. The filament when electrically heated by a suitable source of current, liberates primary electrons which are necessary for the functioning of the tube. When a potential difference is applied between the anode and cathode the electrons liberated by the cathode move toward the anode. The velocity of the electrons flowing between the anode and cathode is a function of the value of the effective potential difference between the anode and cathode. The electrons, as they move from the cathode to the anode, collide with the molecules of the gas in the tube and produce both, new electrons and positive ions. As the primary electrons and the newly formed electrons move toward the anode they pass the grid structure.

The grid may be charged either by a positive or a negative potential and, therefore, helps either to accelerate or to retard the movement of the passing electrons. Hence the action of the grid is such as to control the value of the anode to cathode potential at which the gas becomes ionized, and at which an arc is formed for the passage of a current between the anode and cathode. For convenience and in accordance with engineering parlance, the potential of the grid will hereinafter be considered with reference to the potential of the anode. For a given anode potential, there is a definite critical grid potential at which ionization occurs, thus allowing the tube to pass current in the form of an electric arc.

If the potential of the grid is below this critical grid potential, no discharge occurs, and accordingly, no current passes between the anode and the cathode. On the contrary, if the potential of the grid rises above the critical grid potential, even if only for a moment, a discharge immediately occurs and current passes in the form of an electric arc between the anode and the cathode. After the arc is started, the ionized gas prevents the formation of a space charge and the arc is continued. Consequently, the grid of a gaseous discharge tube is effective only in preventing an arc and also in initiating an arc, but is not effective to extinguish the arc after it has once been started. The grid, however, regains control if the flow of current between the anode and cathode ceases momentarily, thus allowing the gases to deionize. Therefore, by applying an alternating current voltage to the anode and cathode, the grid has an opportunity of regaining control once every cycle and can delay the starting of an arc for as long a time during the cycle as the potential of the grid is below the critical grid potential.

For the current control of grid-controlled gas-filled tubes, three fundamental methods, well known in the art, are available. In the first or "magnitude" method, the phase relation of the grid potential relative to the anode potential remains fixed, whereas the magnitude of the grid potential relative to the anode potential is varied, thus controlling the current flow between the anode and cathode. In the second or "phase-shifting" method, the magnitude of the grid potential relative to the anode potential remains substantially fixed, but the phase relation of the grid potential relative to the anode potential is shifted, thereby controlling the current passing between the anode and the cathode. The third method embodies a combination of the "magnitude" and the "phase-shifting" methods. In the practice of my invention, I prefer the "phase-shifting" method.

When using the "phase-shifting" method to control the grid potential of a tube or tubes utilized to control the speed of a direct current motor supplied with energy from a source of alternating current, a severe duty is imposed on the tube when the motor is operating varying loads and the duty becomes especially severe when the motor is starting heavily loaded. This severe duty, or dangerous, or tube-destroying demand on the tubes is especially serious when the armature circuit of the motor and associated control circuits are set to apply full voltage to a heavily loaded motor. It is, therefore, very desirable to have some automatic, yet simple, means of accelerating the motor slowly, and more and more slowly with greater and greater starting load, thus preventing excessive currents in the tubes before all parts to be heated have attained the normal operating temperature.

The protection of the tubes and the slow automatic acceleration of the motor may be accomplished by slowly shifting the phase relation of the grid potential relative the anode potential as a function of the load on the motor regardless of the final speed setting of the main speed control.

One method for accomplishing the desirable results just pointed out and the arrangement of means are shown by the bridge or phase-shifting circuits 37 and 137 shown in Fig. 1. These circuits comprise a transformer 21 having a primary winding 24 and secondary windings 28, 29 and 30, connected to the alternating current buses 8 and 9 by switches 100, 101, and 102. A capacitor 41 and a control thermionic device or vacuum tube 23 connected in series and each connected to one end terminal of the secondary winding 29 are also provided. The primary winding 36 of a transformer 34 is connected intermediate junctions 39 and 40. The junction 39 is positioned at the mid point of the secondary 29 whereas the junction 40 is positioned intermediate the capacitor 41 and the thermionic device 23. The control thermionic device 23 has an anode 25 connected to one terminal of the secondary winding 29, a cathode 27 connected, for heating purposes, directly to the secondary 28, and a grid 26 disposed to be connected to the negative bus 7 through the compensating phase-shifting circuit arrangement 137 described more in detail hereinafter.

The best understanding of the novel and useful features of my invention can probably be had from a study of the operation of the system of control when the compensating circuits 137 are not used and when they are used.

In Fig. 1, merely for convenience of illustration, switches 100, 101, 103 and 104 are shown as four separate switches. In practice these switches are combined in a single-throw four-pole switch. Similarly switches 102 and 105 are shown as two separate switches, but in practice these switches are so designed as one unit that when switch 102 is closed as shown, switch 105 is open and when switch 102 is closed in the dotted line position, switch 105 is closed.

To understand the operation of the system of control without the load compensating circuits 137, switches 100, 101, 103, 104 and 105 should be considered as closed and switch 102 as closed toward the right, i. e. in the dotted line position. The operation of the switches energizes the primary windings 4 and 24 with alternating current, as is readily apparent from an inspection of Fig. 1. To prevent supplying dangerous potentials to the thermionic devices 10, 11 and 23 and the motor 1 before the filaments 17, 18 and 27 have become heated, a thermal time-limit relay 22 is provided. The circuit for this thermal relay may be traced from bus 8 through switch 102, back contact members 50 of the sequence control contactor 51, heater 52, resistor 53 to the bus 9. After a substantially definite interval of time contact members 54 are closed and a circuit is established from the bus 8 through conductor 55, contact members 54 of the thermal relay 22, coil 56 of the sequence control relay 51 and conductor 57 to the bus 9. Operation of the sequence control relay effects the closing of contact members 58, to establish a holding circuit for coil 56, independent of thermal relay 22, and effects the closing of contact members 59 for energizing control circuits for initiating the operation of the motor 1. From the foregoing explanation it is apparent that the motor cannot be started nor can the thermionic devices 10, 11 and 23 be subjected to excessive voltages before the time interval of the thermal relay 22 has elapsed. The thermionic devices 10 and 11 cannot pass current because the grid 26 of thermionic control device 23 has a high negative charge from bus 7 through contact members 60 and conductor 61, whereas the motor cannot start because contact members 63 of the armature contactor 13 are open.

It should be noted that resistor 65 is connected directly across the buses 6 and 7 and by the use of the resistor 66 adjustably associated with resistors 65 and 31 the final or normal full-load operating speed of the motor 1 can be selected at will. These resistors 31, 65 and 66 are usually of high resistance value and during full-load normal operation, when contact members 60 are open, determine the final negative bias of grid 26 and thus determine the speed of motor 1.

Since capacitor 32 is also interconnected with the buses 6 and 7 and the resistors 31, 65 and 66, the grid 26, when contact members 60 open, will become positively charged at a rate determined by rate of the charging of capacitor 32. As the grid becomes more and more positively charged the thermionic control device 23 passes more and more current until eventually when the capacitor 32 is completely charged the resistance of the circuit from the anode 25 to the cathode 27 is very low. Since the primary 36 of the transformer 34 is connected at the mid-point 39 of the secondary 29 of the transformer 21 and at the junction 40, any variation in the effective resistance below the junction 40 will cause a varying current to flow in the primary winding 36 and the secondary winding 82 will thus shift the phase relation of the voltage in resistors 83 and 84, the conducting circuits connected to the grids 19 and 20, of the discharge devices 10 and 11, respectively, relative to the voltage in conductor 38. Since conductor 38 is connected to the midpoint of the secondary winding 82 of the transformer 34 and since the anodes 15 and 16 are connected to the terminals of the secondary 5 of the transformer 3 the voltages on anodes 15 and 16 and cathodes 17 and 18 will always be in phase. Any selected shift of phase relation of the grid potentials 19 and 20 will cause these tubes or thermionic devices 10 and 11 to break down at any desired point of the cycle. The total result is that the gradual charging of the capacitor 32 causes devices 10 and 11 to break down sooner and sooner so that the voltage that is impressed on the armature of the motor 1 ranges from substantially zero to full voltage as determined by the magnitude of both halves of the wave.

To accomplish the operating characteristics hereinbefore discussed the safety switch 67 and the starting switch 69 should be closed. These operations establish a circuit from bus 6 through contact members 59, safety switch 67, stop switch 68, starting switch 69, coil 70 of control relay 62 to the bus 7. Operation of control relay 62 closes contact members 71, providing a holding circuit for coil 70, and contact members 72 for energizing coil 73 of the contactor 13.

Operation of contactor 13 closes contact members 63 thereby energizing the armature 12 with unidirectional current from the secondary 5 by alternately passing through the thermionic devices 10 and 11.

Since the contact members 60 are also opened by the operation of control relay 62 the capacitor 32 becomes charged more and more and the motor thus accelerates at a rate determined by the charging rate of capacitor 32.

It should be remembered though that when the capacitor 32 has become completely charged the final speed of the motor is determined by the setting or adjustment of resistors 31, 65 and 66. The position of the adjustable conductors of resistors 31 and 66 determines the speed setting of the motor 1, and when the motor has accelerated in the automatic manner—protecting devices 10 and 11 and the motor—the speed of the motor may be controlled as desired by manipulation of the adjustable conductors of resistors 31 and 66.

Therefore, when the phase-shifting circuit has gone through its entire cycle of operation, the phase relation between the grid potential and the anode potential is relatively large, with the result that any one of the power grid-controlled thermionic devices passes current during substantially the entire positive half cycle. Since two devices 10 and 11 are used the current in the armature 12, in view of the inductances of the circuits, will be substantially direct current.

The rate of acceleration of motor 1 is, of course, dependent upon the adjustment of the adjusting conductors for the resistors 31 and 66; the voltage between the buses 6 and 7; and the size and design of the capacitor 32, but in all cases the acceleration must take place during a selected fixed interval of time. Such starting procedure is very frequently a great disadvantage and not infrequently dangerous for the motor and the apparatus driven thereby. If the rate of acceleration of the motor could be varied as a function of the load on the motor, without resorting to cumbersome relays and current responsive contactors, a very useful starting control could be provided.

My invention solves the problem presented in a simple, reliable and inexpensive manner by the use of the load compensating circuit arrangement 137 hereinbefore referred to.

This circuit arrangement 137 comprises a current transformer 74 responsive to the starting load current of the motor 1. By the rectifiers 75 a direct current potential is placed on conductors 106 and 107 which is a direct function of the load of the motor. Conductors 106 and 107 are interconnected by resistors 165 and 166 and capacitors 76, 78 and 132. To make the transformer 74 responsive to the starting load current and to secure proper compensated starting, switches 102 and 105 should be in the position shown in Fig. 1.

Resistors 131, 165 and 166 function in the same manner as resistors 31, 65 and 66, and in conjunction with conductors 106 and 107 may be used to select the potential across conductors 106 and 107 for any given motor starting current.

For most installations the variations in armature current during starting would not be excessive and the capacitors 76 and 132 would suffice to dampen out oscillations (see Fig. 2) but for some installations a special design must be provided to dampen out oscillations of potential between conductors 106 and 107. This special design is provided by reactor 77 and capacitor 78 which two units dampen out potential oscillations.

Since the positive conductor 106, through reactor 77, is connected to the grid 26 and the negative conductor 107 is connected to the negative bus 107 through conductor 61, this change of the grid potential from a given high negative to a less negative value will, in conjunction with capacitor 32, be delayed by an amount determined by the load on the motor. The motor is thus automatically accelerated at a slower rate for a heavy motor load and at a faster rate for a lighter load. Furthermore, the rate cannot be greater than the rate of acceleration without the load compensating circuit arrangement 137.

As the capacitor 32 becomes charged, the left-hand terminal will become more and more positive and the initial load current required for accelerating the motor will decrease. The result is that at final normal load current rated speed is attained.

A further and important characteristic of my invention is the provision of improved speed characteristic of the motor. When the motor is operating at normal speed and load, and when the capacitor is fully charged, as it will be except during starting, and the motor is subjected to a greater load than normal, the positive bias of grid 26 is increased with the result that the voltage on the motor 1 is increased as a function of the load on the motor. The speed regulation is thus very much improved.

My invention is of special utility for planers, shapers, cutters, lathes, etc., and for such applications the speed of the planer platen, considering a planer, often needs to be inched along subject to an inching push-button switch. When the inching switch 202 is depressed a circuit is established from bus 6 through contact members 59, switches 67 and 68, coil 201 of the inching contactor 200, through inch push-button switch 202 to bus 7. Closing of contact members 204 establishes a circuit from the contact members 59 through conductor 203, contact members 204, conductor 205 to the coil 73 of the contactor 13.

The motor 1 is thus inched along. Contact members 206 and adjustable rheostat 207 assure a proper rate of acceleration for the inching operation.

The back contact members 209 on contactor 13 establish a dynamic braking circuit for the motor through resistor 310. The dynamic braking circuit is of utility each time the motor is stopped, but more especially during inching when over-travel may injure the work piece. Coil 208, subject to the voltage drop across 210 during dynamic braking, prevents the opening of contact members 209 before the motor has stopped.

I am aware that other circuit arrangements may be devised by those skilled in the art, once having had the benefit of the teachings of my invention. My claims are, therefore, not to be limited to the specific details herein disclosed but I intend that my claims be given only such limitations in scope as are required by their respective terms and the prior art.

I claim as my invention:

1. A system of control for a motor, in combination, a source of electrical energy, a motor, speed control means adapted to vary the speed of the motor, control thermionic means having a cycle of operation that is normally completed within any predetermined interval of time, means responsive to the current of the motor for controlling the operation of said control thermionic means to change its cycle of operation as a function of the motor current, and thermionic means, responsive to said control thermionic means, adapted to accelerate the motor to any speed selected by said control means.

2. A control system for an electric motor, in combination, a motor, a source of energy for the motor, speed control means whereby any desired normal operating speed may be selected for the motor, thermionic means having operating characteristics that vary in a definite manner during a selected time interval, for automatically accelerating the motor during such time interval to the normal speed selected by said speed control means, and means responsive to the motor load for selecting a time interval for the thermionic means that is a function of the motor load.

3. A control system for an electric motor, in combination, a source of electrical energy, means for connecting the motor to said source, a control electronic tube, control means for varying the operating characteristics of said tube a substantially definite amount during a substantially definite interval of time, means responsive to the load on the motor adapted to control said electronic tube as a function of the load on the motor, and means controlled by said tube for varying the voltage applied to the motor to change the speed of said motor.

4. A control system for an electric motor, in combination, a source of energy, means for connecting the motor to the source of energy, speed control means for the motor, thermionic means independent of said speed control means for controlling the acceleration of the motor, means, operable during a substantially definite time interval, for controlling the thermionic means, and means responsive to the load on the motor for also controlling the thermionic means.

5. In a system of control for a direct current motor supplied with energy from a source of alternating current, in combination, a grid-controlled tube, having an anode, a cathode, and a grid, for supplying direct current to said motor from the source of alternating current, speed control means for selecting motor operating speeds, thermionic time-delay means for shifting the phase relation of the voltage of the grid with reference to the cathode a predetermined angle in a substantially definite time interval, and load compensating means, responsive to the load on the motor, for controlling the thermionic time-delay means, whereby the motor is automatically accelerated to a selected speed in an interval of time determined by both the load on the motor and the time delay means.

6. In a control system for an electric motor, in combination, a grid-controlled tube, having a grid, an anode, and a cathode, adapted to vary the energy application to the motor from a given minimum to a selected maximum, time-limit means, including thermionic means, for effecting such variations during a selected substantially definite time interval, and means responsive to the motor load for changing the operating characteristics of the time-limit means with changes in motor load.

7. In a control system for an electric motor, in combination, a source of alternating current, a motor, a grid-controlled power tube for supplying varying amounts of direct current to said motor from said source of alternating current, time-limit means, including thermionic means, for changing the operating characteristics of the said tube by a predetermined amount during a predetermined interval of time, and motor load responsive means for changing the controlling effect of the time-limit means.

8. A control system for an electric motor including, a motor, thermionic means, timing means controlling said thermionic means, control means responsive to the load on the motor for varying the time constant of said timing means, and second thermionic means controlled by said first named thermionic means for controlling the acceleration of said motor.

RALPH A. GEISELMAN.